United States Patent Office 3,655,707
Patented Apr. 11, 1972

3,655,707
PREPARATION OF ORGANOMERCURY
COMPOUNDS
Roy R. Josephson, West Marlborough Township, Chester
County, Pa., assignor to Hercules Incorporated, Wilmington, Del.
No Drawing. Filed Oct. 10, 1969, Ser. No. 865,491
Int. Cl. C07f 3/12
U.S. Cl. 260—433					9 Claims

ABSTRACT OF THE DISCLOSURE

Organomercury compounds are prepared by contacting a mercurating agent with an electronegatively-substituted aromatic organic compound in liquid hydrogen fluoride as the solvent. Representative of the compounds which are mercurated is nitrobenzene, which otherwise is difficult to mercurate. The reaction may be carried out at room temperature.

---

This invention relates to the preparation of organomercury compounds by the mercuration of aromatic organic compounds. More particularly, it relates to the use of liquid hydrogen fluoride as the solvent in the mercuration of aromatic compounds which otherwise are difficult to mercurate.

The mercuration of aromatic compounds is a well-known reaction, and it is easily carried out with aromatic amines such as aniline and phenolic compounds such as phenol. With such compounds, a mercurating agent such as mercuric acetate will effect reaction at moderate temperatures, and the reaction will ordinarily be completed in a fairly short length of time. Similarly, it is possible fairly easily to mercurate aromatic hydrocarbons such as benzene, although it becomes necessary to utilize elevated temperatures and considerably longer reaction times.

In contrast, the mercuration of aromatic compounds such as nitrobenzene and benzoic acid proceeds with difficulty. High reaction temperatures and long reaction times are necessary and, even so, the yield of mercurated product usually is low. Furthermore, these more drastic conditions promote the formation of undesired isomers and of polymercurated products.

Now, in accordance with this invention, it has been found that aromatic organic compounds which are difficult to mercurate can be mercurated by contacting these compounds, which all are characterized by being substituted with an electronegative group, with a mercurating agent in liquid hydrogen fluoride as the solvent. By using liquid hydrogen fluoride as the solvent, the mercuration may easily be carried out at room temperature and will be completed within a period of a few hours. At more elevated temperatures, the reaction will be completed in a matter of minutes. Furthermore, the reaction products from the process of this invention are primarily monomercurated materials in which one isomer predominates. Particularly at the lower reaction temperatures, there is little or no equilibration of isomers during the reaction.

The process of this invention is illustrated in Examples 1 to 6 inclusive. Example 7 is included for comparative purposes.

EXAMPLE 1

To a polyethylene reaction vessel containing a stir bar was added 20 ml. of anhydrous hydrogen fluoride, 10.8 g. (0.05 mole) of mercuric oxide and 10 ml. (0.10 mole) of nitrobenzene. The vessel was sealed and mounted over a magnetic stirrer. The reaction mixture was then stirred at room temperature (about 25° C.) for 16 hours, at the end of which time the mixture was poured slowly into 500 ml. of water in which was dissolved 15 g. of potassium bromide. To this mixture was slowly added 56.0 g. of potassium hydroxide pellets. The precipitated bromomercurinitrobenzene was collected on a vacuum filter and washed, first with water and then with methanol. The product was dried in vacuum and weighed. It amounted to 18.3 g., corresponding to a yield of 91% of the theoretical based on the amount of mercuric oxide charged to the reaction.

A 0.2 g. sample of the above product was admixed with 10 g. of sodium bromide, 20 ml. of water and 10 ml. of carbon tetrachloride. This mixture was stirred and bromine was added dropwise to maintain a deep red color in the carbon tetrachloride layer. The mixture was stirred until all the solid had dissolved; then the excess bromine was destroyed by addition of sodium bisulfite. The carbon tetrachloride layer was analyzed by gas chromatography and was found to contain 0.094 g. of m-bromonitrobenzene, showing that the original mercurated product was predominately the metal isomer.

EXAMPLE 2

The procedure of Example 1 was repeated except to substitute 15.8 g. (0.05 mole) of mercuric acetate for the 10.8 g. of mercuric oxide of Example 1 and to isolate the product as the chloromercurinitrobenzene through utilization of potassium chloride instead of potassium bromide. The yield of product was 87% based on the mercuric acetate charged.

EXAMPLE 3

The procedure of Example 2 was duplicated except to isolate the product as the bromomercurinitrobenzene, as in Example 1. The yield of product was 81% based on the mercuric acetate charged.

EXAMPLE 4

The procedure of Example 1 was followed except to substitute 10 g. (0.082 mole) of benzoic acid for the 10 ml. of nitrobenzene of Example 1 and to isolate the product as the chloromercuribenzoic acid through use of potassium chloride instead of potassium bromide. The dried chloromercuribenzoic acid amounted to 17.7 g., corresponding to a yield of 88% based on the mercuric oxide charged. Gas chromatography analysis established that the product was primarily the meta isomer.

EXAMPLE 5

The procedure of Example 4 was repeated except to substitute mercuric acetate for mercuric oxide, as was done in Example 2. The yield of chloromercuribenzoic acid was 83% based on the mercuric acetate charged.

EXAMPLE 6

A 20 ml. Teflon-lined Monel metal reactor equipped with a magnetic stirring bar was charged with 3.2 grams (0.01 mole) of mercuric acetate and 2.8 g. (0.023 mole) of nitrobenzene. The reactor was cooled in Dry Ice and 10 ml. of liquid hydrogen fluoride was added. The reactor was promptly sealed and placed in a 90° C. water bath. The reaction mixture was stirred for two hours at 90° C. After cooling the reactor to room temperature, the hydrogen fluoride was evaporated from the reaction product mixture with a stream of nitrogen and the residue was added to a solution of 3 g. of sodium chloride in 100 ml. of water. The mixture was stirred thoroughly and 50 ml. of hexane was added to dissolve the excess nitrobenzene. The remaining solid was separated by filtration, washed with water and hexane, then dried. There was obtained 2.55 g. of chloromercurinitrobenzene as product, corresponding to a 71.7% yield based on the mercuric acetate charged. A sample of the product was treated with bromine and analyzed as in Example 1 and was found to contain 60% of the meta isomer and 40% of the ortho and para isomers.

EXAMPLE 7

The procedure of Example 6 was followed except to use 5.64 g. (0.046 mole) of nitrobenzene and 6.38 g. (0.02 mole) of mercuric acetate and 0.6 ml. of acetic acid as the solvent instead of liquid hydrogen fluoride. After cooling the reactor, a small amount, 0.2 ml., of liquid hydrogen fluoride was added as catalyst. The amount of chloromercurinitrobenzene obtained was only 0.37 g., corresponding to a 5.2% yield based on the mercuric acetate charged. The markedly improved rate of reaction in Example 6 is evident.

The compounds to which the process of this invention is applicable are those aromatic organic compounds containing substituent groups which are strongly electronegative relative to the hydrogen atom. These groups are the carboxyl, carboalkoxy, nitro and halogen groups. The aromatic ring system in these compounds may be that of, for example, benzene, naphthalene and anthracene. Accordingly, representative halogen-substituted compounds are chlorobenzene, 1,2-dichlorobenzene, 1,4-dichlorobenzene and the corresponding bromo-, iodo- and fluoro-derivatives. Representative nitro-substituted compounds are nitrobenzene, o-nitrotoluene and p-nitrotoluene. Any one compound may contain two or more different electronegative groups, and a compound containing both halogen and nitro-substitution is illustrated by 6-chloro-2-nitrotoluene. Representative aromatic carboxylic acids are benzoic acid, terephthalic acid and naphthoic acid. The corresponding lower alkyl esters of the aromatic carboxylic acids are those in which the alkyl group contains from 1 to about 8 carbon atoms. The alcohols corresponding to such alkyl groups range from methanol to octanol. Typical esters are ethyl benzoate, butyl benzoate, octyl benzoate and dimethyl terephthalate.

The aromatic organic compound and the mercurating agent may be used in equimolar amounts, but it ordinarily is desirable to have an excess of the aromatic organic compound over that required to react with the mercurating agent, as shown in the examples, wherein the molar ratio of aromatic compound to mercurating agent was about 2:1. In general, this ratio may be from about 1:1 to about 10:1, the preferred ratios being in the range from about 1.5:1 to about 3:1.

Any of the known mercurating agents can be used. The preferred reagent is mercuric oxide, which on contact with the hydrogen fluoride solvent is converted to mercuric fluoride. However, other mercurating agents such as mercuric acetate, mercuric chloride or mercuric bromide also may be used.

In the examples, the process of this invention was carried out either at room temperature or at a temperature of about 90° C. In general, however, the reaction can be effected within a temperature range of about 10° to about 100° C. The preferred range is from about 15° to about 50° C., most preferably from about 15° to about 30° C. The rate of reaction increases with increasing temperature, but better yields of product are obtained by operating at the lower temperatures in the overall temperature range. Sufficient pressure is applied at the prevailing temperature to maintain the hydrogen fluoride in the liquid phase. Thus, the pressure will range from slightly above atmospheric at 20° C. as the reaction temperature to about 85 p.s.i.g. at 100° C. as the reaction temperature.

The products from the process of this invention may be isolated per se, that is, as the fluoromercuri-derivatives, by evaporating the hydrogen fluoride from the reaction product mixture under a stream of an inert gas, such as nitrogen. Moreover, as shown in the examples, the fluoromercuri-derivatives may be converted to the corresponding bromomercuri- and chloromercuri-derivatives by reaction with an alkali metal bromide or chloride, such as potassium bromide or potassium chloride. The corresponding sodium salts also may be used. Instead of the bromides and chlorides, the alkali metal iodides may be used to produce the iodomercuri-derivatives.

The monomercurated compounds produced by the process of this invention are well known as antiseptics, bacteriostats, fungicides, germicides and disinfectants. They also are useful in the preparation of other aromatic compounds because of the many different chemical transformations which they can undergo.

What I claim and desire to protect by Letters Patent is:

1. A process for the mercuration of aromatic organic compounds which comprises contacting a mercurating agent with an aromatic organic compound containing at least one substituent group selected from the group consisting of carboxyl, carboalkoxy, nitro and halogen groups in liquid hydrogen fluoride as the solvent.

2. The process of claim 1 in which the mercurating agent is mercuric oxide.

3. The process of claim 1 in which the mercurating agent is mercuric acetate.

4. The process of claim 1 in which the aromatic organic compound is a nitro-substituted aromatic compound.

5. The process of claim 4 in which the compound is nitrobenzene.

6. The process of claim 1 in which the aromatic organic compound is a halogen-substituted aromatic compound.

7. The process of claim 6 in which the compound is chlorobenzene.

8. The process of claim 1 in which the aromatic organic compound is an aromatic carboxylic acid.

9. The process of claim 8 in which the carboxylic acid is benzoic acid.

References Cited
UNITED STATES PATENTS

| | | | |
|---|---|---|---|
| 2,353,312 | 7/1944 | Kobe et al. | 260—434 |
| 2,502,222 | 3/1950 | Kaplan et al. | 260—434 |
| 2,502,382 | 3/1950 | Kaplan et al. | 260—433 |

TOBIAS E. LEVOW, Primary Examiner

H. M. S. SNEED, Assistant Examiner

U.S. Cl. X.R.

260—434